United States Patent [19]

Le Moigne et al.

[11] Patent Number: 5,758,750
[45] Date of Patent: Jun. 2, 1998

[54] AUTOMATIC ADJUSTMENT STRUT FOR A DRUM BRAKE

[75] Inventors: Daniel Le Moigne, Le Plessis Grammoire; Serge Tempestini, St. Ouen, both of France

[73] Assignee: Bosch Systems de Freinage, Drancy, France

[21] Appl. No.: 341,543

[22] PCT Filed: Nov. 9, 1994

[86] PCT No.: PCT/FR94/01309

§ 371 Date: Nov. 21, 1994

§ 102(e) Date: Nov. 21, 1994

[87] PCT Pub. No.: WO95/16864

PCT Pub. Date: Jun. 22, 1995

[30] Foreign Application Priority Data

Dec. 13, 1993 [FR] France ................... 9314907

[51] Int. Cl.$^6$ ............................................ F16D 65/56
[52] U.S. Cl. .................... 188/79.64; 188/196 BA
[58] Field of Search ..................... 188/79.52, 79.64, 188/196 BA, 79.51, 79.53, 196 R, 196 B, 79.54; 192/111 A

[56] References Cited

U.S. PATENT DOCUMENTS

| | | | |
|---|---|---|---|
| 4,503,949 | 3/1985 | Carré et al. | 188/196 BA |
| 4,646,881 | 3/1987 | Denree et al. | 188/196 BA |
| 4,729,457 | 3/1988 | Cousin et al. | 188/196 BA |

*Primary Examiner*—Josie Ballato
*Attorney, Agent, or Firm*—Leo H. McCormick, Jr.

[57] ABSTRACT

An automatic adjustment strut for a drum brake which is mounted in the vicinity of actuating member and located between a first end of first and second shoes. The first and second shoes are lined with friction pads. The strut has a body with first and second ends which bear on the first and second shoes and extension arrangement for automatically extending the body as a function of ear of the friction pads. The extension arrangement is formed by a screw-nut system and controlled by a pawl which urges toothing secured to a member of a screw-nut system. The pawl is carried by an elastic strip secured to the body of the strut. The elastic strip is separated from the body of the strut when the drum brake is in the position of rest. A lever mechanism tilts to allow the elastic strip and the body of the strut to move toward each other when the shoes are urged apart through actuating member. The lever mechanism has a first arm and a second arm with the first arm bearing on a nut in the screw-nut system. The first arm is pierced with an oblong opening through which a screw of the screw-nut system passes. The second arm which extends from the first arm with a vertex of angle greater than 90°, is located between the body of the strut and the elastic strip. The strut is characterized in that when the actuating member is implemented, the first arm of the lever mechanism bears on the nut at two zones which are substantially diametrically opposite with respect to the axis of symmetry of the nut and acts on nut to rotate a screw and thereafter change the space relationship between a head and the body to provide a corresponding changed in the linear space between the first ends of the first and second shoes.

5 Claims, 2 Drawing Sheets

AUTOMATIC ADJUSTMENT STRUT FOR A DRUM BRAKE

The present invention relates to the field of drum brakes, particularly those intended to equip motor vehicles, and it relates more precisely to the automatic adjustment devices intended to compensate for the wear of the friction pads on the shoes of such drum brakes, these devices bringing about the extension of a strut, which is located between the shoes, depending on the wear of the friction pads, in order to define a minimal separation distance between the shoes depending on the wear of the friction pads carried by these shoes, that is to say to provide a relatively constant travel for the means for actuating the drum brake.

BACKGROUND OF THE INVENTION

Such struts with an automatic adjustment device are well known in the prior art, such as, for example, from documents EP-A-0,077,726 (U.S. Pat. No. 4,503,949), EP-A-0,219,384 (U.S. Pat. No. 4,729,457) or EP-A-0,262,014.

SUMMARY OF THE INVENTION

In these documents, the strut comprises a screw-nut assembly controlled by a pawl urging toothing secured to one of the elements of the screw-nut system, the pawl being carried by an elastic strip secured to the strut, the elastic strip being separated from the strut, when the brake is in the position of rest, by means of a lever which, by tilting, allows the elastic strip and the strut to be brought closer together when the shoes are urged apart by the actuating means, the lever including a first arm bearing on the nut of the screw-nut system and pierced with an opening through which the screw of the screw-nut system passes, and a second arm forming an angle greater than 90° with respect to the first arm and located between the strut and the elastic strip.

The design of the known devices imposes, particularly on the nut of the screw-nut system, parasitic loads which increase the friction of the nut on the screw and which may thus prevent extension of the strut until the external loads which are exerted on it are sufficient to overcome this friction and bring about the desired extension. This results in erratic operation of the known automatic adjustment devices.

In addition, the detrimental effect of these parasitic loads is very much amplified through the manufacturing tolerances of the various elements of which these devices are composed, so that the extension obtained is very variable from one strut to the other, all other things moreover being equal.

As a result, known struts only very imperfectly fulfil their role of fixing a minimal distance between the shoes, and very often define a distance which is less than the desired minimal distance, following the absence of extension of the strut. This then results in an excessive travel of the actuating means when these are mechanical, or an excessive consumption of fluid when the actuating means are hydraulic.

The object of the present invention is consequently to provide an automatic adjustment strut for a drum brake which does not exhibit these drawbacks, that is to say which is exempt of parasitic loads at the screw-nut system level so as to provide optimal operation of the automatic adjustment device and a distance between the shoes which corresponds effectively to the desired minimal distance.

To this end, according to the invention, the first arm of the lever controlling the tilting of the elastic strip bears on two substantially diametrically opposed zones of the nut of the screw-nut system. In that way, the loads exerted by the lever on the nut have a substantially axial resultant, and therefore do not generate parasitic loads on it.

The invention will be better understood and other objects, features and advantages will emerge clearly from the description while viewing the drawings:

DETAILED DESCRIPTION OF THE INVENTION

Figure 1:
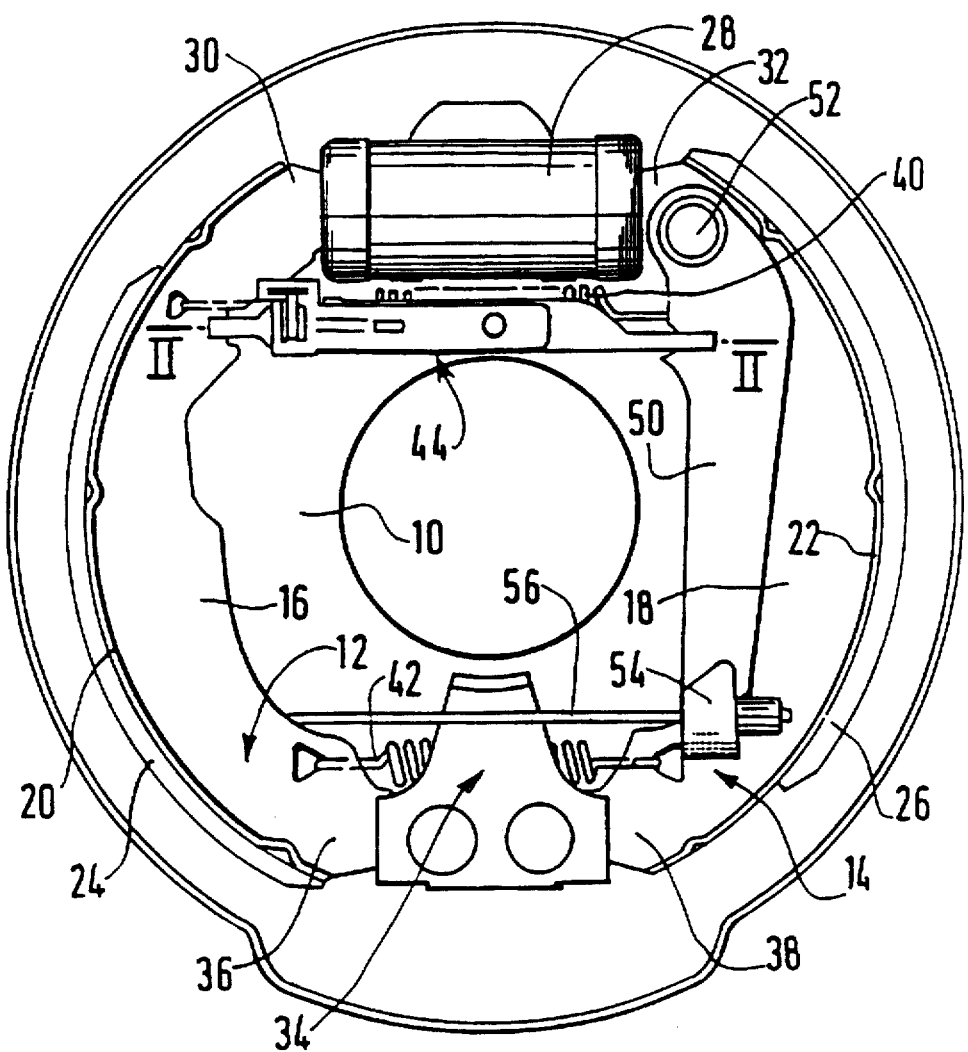
FIG. 1 is a plan view of a drum brake of the prior art, and capable of receiving an automatic adjustment strut produced in accordance with the present invention.

FIG. 1 represents a drum brake of conventional design, which comprises a support plate 10 intended to be associated with a stationary part of a vehicle (this part not being represented), and on which are received, so that they can slide, two brake shoes 12 and 14. Each of the shoes 12 and 14 includes a substantially flat web 16, 18 and a curved rim 20, 22 on which a friction pad 24, 26 is fixed.

Actuating means, such as a wheel cylinder 28, for example, are located between two ends 30 and 32 of the shoes 12 and 14, and an anchoring block 34, secured to the support plate 10, is located between two other ends 36 and 38 of the shoes 12 and 14. Return springs 40 and 42 are located in the vicinity of the wheel cylinder and of the anchoring block in order to urge the ends 30 and 32 of the shoes against the wheel cylinder and the ends 36 and 38 against the anchoring block.

A strut, denoted overall by the reference 44, is located in the vicinity of the wheel cylinder 28 so as to define the distance separating the ends 30 and 32 of the shoes at rest. The ends 46 and 48 each include a slot receiving the web 16, 18 of each shoe 12 and 14.

In the example represented in FIG. 1, the slot formed in the end 48 also receives a mechanical actuating lever 50 mounted so that it can pivot on the end 32 of the shoe 14 by means of a rivet forming a pivot 52, and the free end 54 of which receives one end of a cable for operating a handbrake or emergency brake 56, actuated from the passenger compartment of the vehicle.

Figure 2:
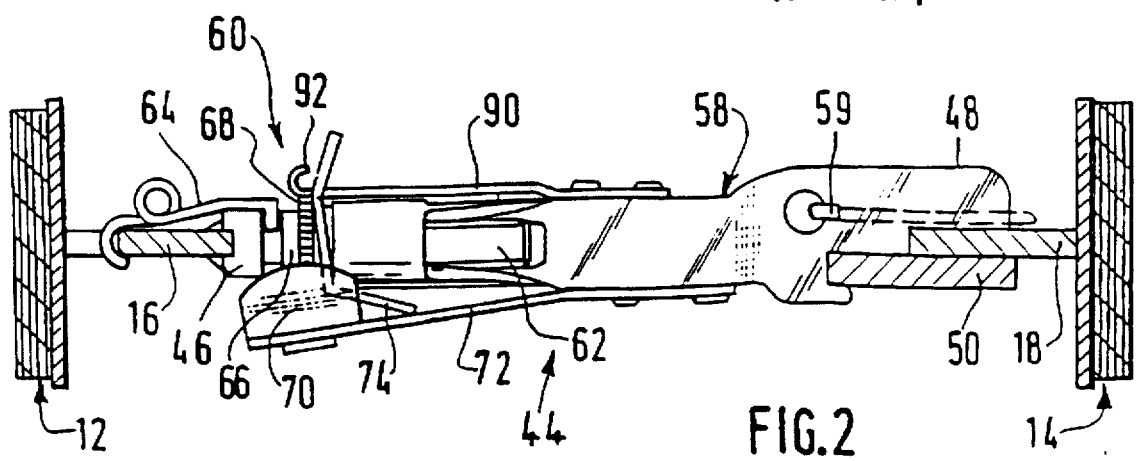
FIG. 2 is an enlarged view, in partial section on the line II—II of FIG. 1, of an automatic adjustment strut of the prior art.

As is best seen in FIG. 2, the strut 44 is formed of a body 58 forming the end 48 bearing via a spring 59 on the shoe 14 and on the handbrake lever 50, and of a screw-nut system, denoted overall by the reference 60, forming the end 46, bearing on the shoe 12.

The screw-nut system 60 includes a screw 62, the head 46 of which is held in engagement with the web 16 of the shoe 12 by a spring 64, and the shank of which is received freely in an axial opening in the strut body 58, and a nut 66 engaged on the screw 62 and externally carrying toothing 68 intended to interact selectively with a pawl 70 secured to the overhanging end of an elastic strip 72 mounted on the strut body 58.

Figure 3:
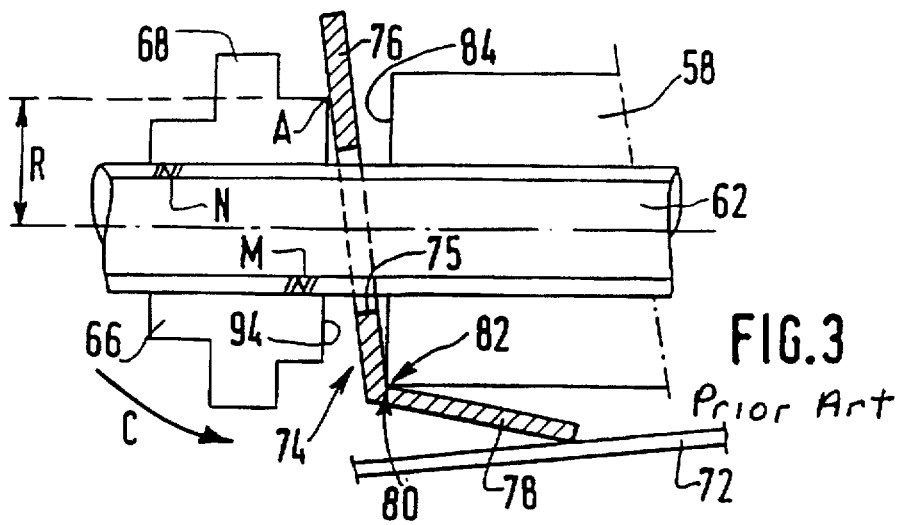
FIG. 3 is an even more enlarged view of the screw-nut system and lever of the strut of FIG. 2.

The strut 44 also includes a lever 74, represented in more detail in FIG. 3, formed of a first arm 76 equipped with an opening 75 in which the screw 62 freely penetrates, this arm being interposed between the nut 66 and the adjacent end face of the strut body 58, and of a second arm 78, the free end of which urges the elastic strip 72 away. The first 76 and second 78 arms of the lever 74 are substantially straight and between them form an angle greater than 90°, and typically close to 100°. The lever 74 thus forms a dihedron bearing via its vertex 80 on an edge 82 of the planar end face 84 of the body 58, and can tilt about this edge 82.

The strut 44 may finally include a thermal locking system, such as the one which is described in the aforementioned document EP-A-0.219,384, and consists of a bimetallic strip 90, one end of which is fixed to the strut body 58 and the other end 92 of which penetrates into an opening in the first arm, and is capable of acting on this arm in order to prevent the lever from tilting and consequently stop the automatic adjustment device from operating in the event of the drum brake overheating.

The operation of the drum brake and of the automatic adjustment device which have just been described is conventional and will be recalled here purely as a reminder, with reference to FIGS. 2 and 3.

At rest, the spring 40 urges the shoes 12 and 14 towards each other, and consequently the ends 46 and 48 of the strut 44 towards each other. In doing so, the first arm 76 of the lever 74 is pressed against the planar end face 84 of the strut body 58 by the nut 66. The second arm 78 of the lever 74 then urges the elastic strip 72 away from the body 58, which disengages the pawl 70 from the toothing 68 of the nut 66.

When the wheel cylinder 28 is actuated, the ends 30 and 32 of the shoes 12 and 14 are separated from one another such that the friction pads 24 and 26 are brought into frictional engagement with the brake drum (not represented) so as to create a braking torque.

Simultaneously, the body 58 and the assembly 60 are separated from one another under the action of the springs 59 and 64. The elastic strip 72 bearing on the second arm 78 of the lever 74 tends to cause the latter to tilt about the edge 82 as far as this is permitted by the relative movement of the nut 66 with respect to the body 58. The strip 72 then moves closer to the body 58, and likewise the pawl 70 moves closer to the toothing 68.

If at least one of the friction pads 24 or 26 exhibits excessive wear, the wheel cylinder must then separate the shoes by an amount which is greater than a predetermined amount so that they engage the brake drum. The nut 66 then moves away from the body 58 by an amount which is greater than this predetermined amount, the pawl 70 engages in the toothing 68 and rotationally entrains the nut 66, which causes the nut 66 to unscrew on the screw 62, and consequently moves the nut 66 away from the head 46 of the screw 62.

When the braking action is released, the spring 40 brings the shoes 12 and 14 closer to one another, which has the result of moving the nut 66 closer to the body 58. The reverse rotation of the nut on the screw 62 is prevented by the friction between the nut 66 and the first arm 76 of the lever 74. Since this nut has been screwed by preceding action on the screw 62, the strut 44 returns to a position in which it has a length which is greater than the length which it had before the braking action.

During the next braking action, the wheel cylinder will then have to separate the shoes by an amount which is less than the previous amount. If this value is still greater than the predetermined amount, the same process for extending the strut is repeated.

It is understood, therefore, that the strut 44 makes it possible to define a minimal separation distance between the shoes, which distance is a function of the wear of the friction pads, so that the wheel cylinder 28 or cable 56 has to actuate them only over this minimal distance. Such a minimal distance corresponds to what has become known in the art as the running clearance of the drum brake.

In contrast, in FIG. 3, it is seen that when the drum brake is actuated, the tilting of the lever 74 takes place under the action of the strip 72 on the second arm 78 so that the first arm 76 remains constantly in contact with the nut 66, this contact taking place at a point A on the periphery of the face 94 of the nut pointing towards the face 84 of the body 58.

The first arm 76 of the lever therefore exerts, on this point A, a force which is substantially parallel to the axis of the strut, this axis being practically coincident with the axis of the screw 62, this force acting at a distance R from this axis.

It follows that the nut 66 is subjected to a rotational torque in the direction of the arrow C in FIG. 3, and is in contact with the shank of the screw 62 solely by the threads located at the locations such as M and N in FIG. 3, which are thus the only ones to participate in the interaction between the nut 66 and the screw 62 when the automatic adjustment device comes into play, the other threads having no action. Parasitic loads are therefore generated by the arm 76 in the nut 66 which give rise to undesirable stresses generating excessive friction at the screw 62-nut 66 interaction level.

This friction may be such that it prevents the rotation of the nut 66 under the action of the pawl 70, and thus stops the automatic extension of the strut when this is necessary. The actuating means, hydraulic, such as the wheel cylinder 28, or mechanical, such as the handbrake lever 50, must therefore effect a significant travel in order to actuate the drum brake.

This problem is solved, by virtue of the invention, by modifying the way in which the first lever arm 76 bears on the nut 66 in order to eliminate these parasitic stresses.

Figures 4A, 4B:
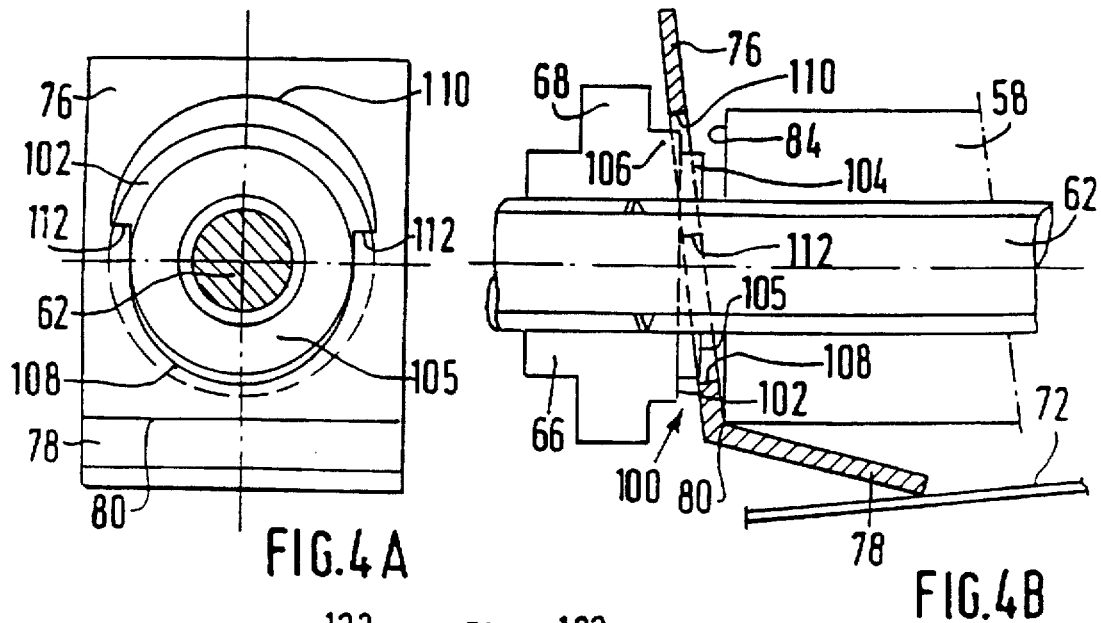
FIGS. 4A and 4B are views, respectively in plan and in section similar to that of FIG. 3, of a screw-nut system and lever for a strut produced in accordance with the present invention.

It is seen in FIGS. 4A and 4B that the nut 66 is formed, on the side intended to come to face the face 84 of the strut body 58, with a cylindrical part 100. According to this embodiment, the cylindrical part 100 is stepped so that it exhibits a shoulder 102 between a cylindrical part of smaller diameter 104, located more towards the outside, and an intermediate part 106. The cylindrical part 104 is bounded by a planar circular face 105.

The first arm 76 of the lever 74 is formed with an opening of oblong overall shape. The periphery of this opening is formed of a first substantially semicircular contour 108, the radius of which lies between those of the cylindrical parts 104 and 106 of the nut 66, and of a second substantially semicircular contour 110, the radius of which is greater than that of the intermediate part 106 of the nut 66. The contours 108 and 110 are joined together by two shoulders 112, both located substantially in a diametral plane of the oblong opening and therefore at the same distance from the vertex 80 of the dihedron formed by the two arms of the lever 74.

When the strut, including the nut and the lever which have just been described, is installed in a drum brake, and when the latter is in the position of rest, the screw-nut assembly 60 is urged towards the body 58, as was seen above.

In this position, it is understood that the cylindrical part 104 of the nut 66 penetrates entirely into the opening in the arm 76, because it has a radius less than that of the contour 108, and, a fortiori, less than that of the contour 110. The cylindrical part 104 is formed with a height, measured axially between the face 105 and the shoulder 102, which is slightly greater than the thickness of the arm 76, so that, in the position of rest of the drum brake, the face 105 of the nut 66 comes into abutment on the face 84 of the body 58.

When the wheel cylinder 28 is actuated, the ends 30 and 32 of the shoes 12 and 14 are separated from one another, as are the body 58 and the screw-nut assembly 60 via the springs 59 and 64 acting on the body 58 and on the head 46 of the screw 62.

As before, the elastic strip 72 bearing on the second arm 78 of the lever 74 tends to make the latter tilt about the edge 82 of the body 58, the rotational movement of the lever 74 being limited by the nut 66 with which the first arm 76 remains in contact.

By virtue of the specific configuration, according to the invention, of the opening made in the first arm 76, in conjunction with the specific shape of the cylindrical part 100 of the nut 66, the contact between the arm 76 and the nut 66 takes place via shoulders 112.

The first arm 76 of the lever therefore exerts, on the nut 66, via these shoulders 112, forces which are substantially equal and of the same direction, the resultant of which is a force applied to the middle of their point of application, that is to say in the vicinity of the axis of symmetry of the nut 66 because the shoulders 112 are located in a substantially diametral plane of the opening of the arm 76.

The result of this is thus that when the body 58 and the head 46 of the screw are urged away from each other during the actuation of the brake, the arm 76 of the lever urges the nut 66 in the direction of the head of the screw, applying to it a force pointing substantially along its axis of symmetry. It follows that all the threads of the nut 66 participate in the interaction of the latter with the screw thread of the screw 62, and that the rotation of the nut on the screw when the pawl 70 engages the toothing 68 takes place under optimal conditions.

On the other hand, since the point of application of the force transmitted by the arm 76 of the lever 74 to the nut 66 is closer to the centre of rotation 80 of this lever than in the prior art, this force transmitted to the nut is also greater. Stemming from this is the fact that when the braking action is released, the reverse rotation of the nut is prevented under better conditions.

This increase in the action force of the lever on the nut is obtained at the cost of a corresponding decrease in the travel of the point of application of this force, which decrease can be compensated for by increasing the angle between the two arms 76 and 78 of the lever 74 in order to obtain an axial travel of the shoulders 112 of the same value as the travel of the point A in the prior art.

The shoulders 112 have been represented, in FIGS. 4A and 4B slightly offset with respect to the axis of symmetry of the nut 66 and of the screw 62, but it is quite clear that they can be aligned with this axis, or even offset with respect to this axis in the other direction, that is to say on the side of the vertex 80 with respect to the small diameter of the oblong opening.

A significant advantage afforded by the invention also lies in the fact that the nut 66 comes into direct contact with the body 58, via their faces 94 and 84, without the first arm of the lever being interposed between them. As a result, the manufacturing tolerances of the lever have no influence over the operation of the strut, and the running clearance of the drum brake, that is to say the distance through which the nut 66 travels with respect to the body 58, before the pawl 70 engages the toothing 68, is determined solely by the nut 66. It has thus been possible to measure, on various drum brakes, running clearances which were practically equal to the theoretical running clearances.

Figures 5A, 5B:
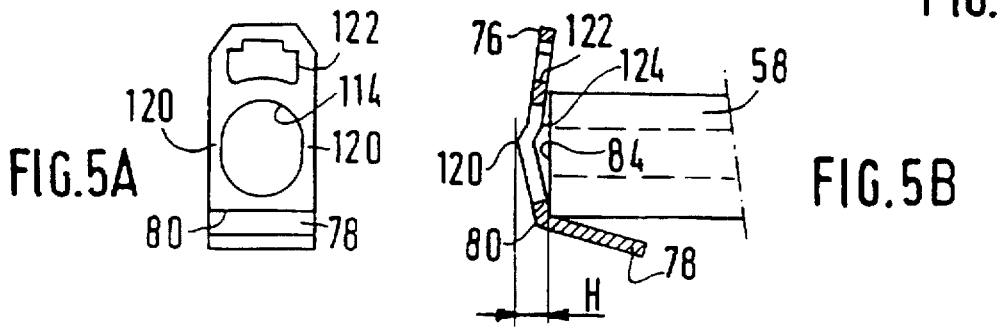
FIGS. 5A and 5B are views, respectively in plan and in section, of a variant of the lever of FIGS. 4A and 4B, and FIGS. 6A and 6B are views, respectively from the side and in section, of a nut intended to interact with the lever of FIGS. 5A and 5B.
Figures 6A, 6B:
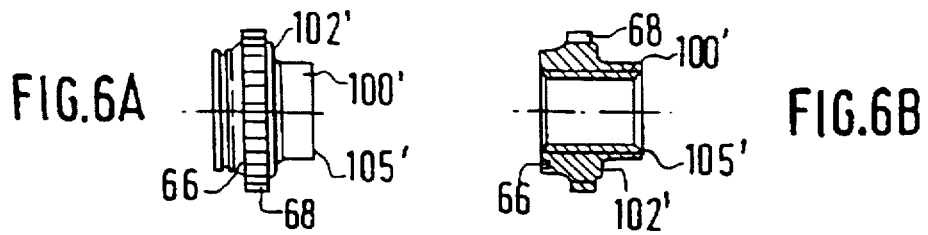

FIGS. 5A and 5B and 6A and 6B represent a variant of the embodiment which has just been described. FIGS. 6A and 6B show that the nut 66 is formed with a non-stepped cylindrical part 100', so that the shoulder 102' is formed at the joint between this cylindrical part 100' and the body of the nut 66.

On the other hand, as seen in FIGS. 5A and 5B, the first arm 76 of the lever 74 is formed with an undulation extending parallel to the vertex 80 of the angle between the two arms of the lever 74, and made substantially along the small diameter of an oblong opening 114 in the arm 76, this small diameter being slightly greater than the diameter of the cylindrical part 100' of the nut 66. The arm 76 of the lever thus exhibits a first undulation formed by two vertices 120 on either side of the opening 114, substantially along a diameter of this opening.

In a way analogous to the preceding embodiment, provision will be made for the undulation to have a height H, measured axially between the face 84 of the body 58 and the vertices 120, when the lever 74 is in place on the body 58 and when the second arm 78 is separated therefrom as much as possible, as represented in FIG. 5B, which height is slightly less than the height of the cylindrical part 100' of the nut 66, measured axially between the shoulder 102' and the face 105'.

When the strut is assembled with the nut and the lever of FIGS. 5A and 5B and 6A and 6B, it is understood that the vertices 120 of the arm 76 interact, when the wheel cylinder 28 or the lever 50 is actuated, with the shoulder 102' of the nut 66, in an identical manner to the description hereinabove, affording the same advantages, namely a force applied to the nut 66 substantially along its axis of symmetry, in order to facilitate its rotation under the effect of the pawl 70 at the beginning of a braking action, and in order, in contrast, to prevent it when a braking action is released.

It can therefore be clearly seen that, according to the present invention, an automatic adjustment strut has been produced for drum brake, in which the lever exerts on the nut forces, the resultant of which is applied substantially along the axis of symmetry of this nut. As a result of this the nut is urged by the lever under optimal conditions, and is no longer the route of parasitic loads or stresses, and that the rotation of the nut is thus facilitated when desired, and, in contrast, is rendered more difficult when it is not desired.

It is additionally seen that the lever and the nut alone have been modified with respect to those of a strut of the prior art. This results in a very important advantage of the invention, namely that known struts can easily be adapted, during a servicing operation of the drum brake, or as a preventative measure, in order to incorporate the teachings of the present invention therein.

For this purpose an additional opening 122, as represented in FIGS. 5A and 5B could be made in the arm 76 of the lever, in order to pass the end 92 of a bimetallic strip, when the strut is provided therewith, into this opening. In the case of a cranked lever arm like the one in FIGS. 5A and 5B, a second undulation 124, of opposite direction from the first undulation 120 could be made in the arm 76 so that the opening 122 occupies, relative to the bimetallic strip 90, when the brake is in the position of rest, approximately the same location as the one which is made in a lever of the prior art, so that the bimetallic strip continues to fulfil its thermal locking function after the nut and the lever of the invention have been installed on the strut.

We claim:

1. An automatic adjustment strut for a drum brake, intended to be mounted in the vicinity of an actuating means and located between a first end of first and second shoes, said first and second shoes being lined with friction pads, said strut having a body with first and second ends which bear on said first and second shoes and extension means for automatically extending said body as a function of wear of said friction pads, said extension means being formed by a screw-nut system and controlled by a pawl urging toothing secured to a member of said screw-nut system, said pawl being carried by an elastic strip secured to said body of said strut, said elastic strip being separated from said body of said strut, when said drum brake is in the position of rest, by means of a lever mechanism which tilts to allow said elastic strip and said body of said strut to move toward each other when said shoes are urged apart through said actuating means, said lever mechanism having a first arm and a second arm, said first arm bearing on a nut in said screw-nut system, said first arm being pierced with an oblong opening through which a screw of said screw-nut system passes, said second arm extending from said first arm with a vertex of angle greater than 90° and being located between said body of said strut and said elastic strip, said strut being characterized in that when said actuating means are implemented, said first arm of said lever mechanism bears on said nut at two zones which are substantially diametrically opposite with respect to the axis of symmetry of the nut and when the actuating means are at rest, said nut bears directly on a face of said body of said strut.

2. The strut according to claim 1, characterized in that said nut is formed with a stepped cylindrical body having a shoulder between a cylindrical part and an intermediate part, said cylindrical part having a smaller diameter than said intermediate part, and said opening in said first arm of said lever included a first substantially semicircular contour having a radius which lies between corresponding cylindrical parts of said stepped cylindrical part of said nut and a second substantially semicircular contour, said second semicircular contour having a radius which is greater than that of an intermediate part of the stepped cylindrical part of said nut, said first and second contours being joined together by first and second shoulders, said first and second shoulders of said first arm of said lever bearing on said shoulder of said nut when the actuating means are implemented.

3. The strut according to claim 2, characterized in that said cylindrical part of said nut has a the height which is slightly greater than a thickness of said first arm of said lever.

4. The strut according to claim 1, characterized in that said nut has a body formed with a shoulder located at the joint between a cylindrical part and a first part, and said first arm of said lever is formed with an undulation extending parallel to the vertex of an angle between said first and second arms of said lever and substantially along a small diameter of said oblong opening, said small diameter being slightly greater than said diameter of said cylindrical part, said first arm of said lever having first and second vertices located on opposite sides of said oblong opening, said first and second vertices of said first arm of the lever bearing on said nut when the actuating means are implemented.

5. The strut according to claim 4, characterized in that said cylindrical part of said nut has a height which is slightly greater than a height of said vertices of said undulation.

* * * * *